United States Patent
Scherba et al.

(10) Patent No.: US 11,618,295 B2
(45) Date of Patent: Apr. 4, 2023

(54) ELECTRONIC SUSPENSION CONTROL SYSTEM FOR A VEHICLE

(71) Applicant: Valid Manufacturing Ltd., Salmon Arm (CA)

(72) Inventors: Justin Paul Scherba, Salmon Arm (CA); Jack William Fenkhuber, Salmon Arm (CA); Luke Wilfred Heckrodt, Salmon Arm (CA)

(73) Assignee: Valid Manufacturing Ltd., Salmon Arm (CA)

( * ) Notice: Subject to any disclaimer, the term of this patent is extended or adjusted under 35 U.S.C. 154(b) by 0 days.

(21) Appl. No.: 17/388,880

(22) Filed: Jul. 29, 2021

(65) Prior Publication Data

US 2022/0032715 A1 Feb. 3, 2022

Related U.S. Application Data

(60) Provisional application No. 63/057,997, filed on Jul. 29, 2020.

(51) Int. Cl.
*B60G 17/052* (2006.01)

(52) U.S. Cl.
CPC ........ *B60G 17/052* (2013.01); *B60G 2400/10* (2013.01); *B60G 2400/51222* (2013.01)

(58) Field of Classification Search
CPC .............. B60G 17/052; B60G 2400/10; B60G 2400/51222
See application file for complete search history.

(56) References Cited

U.S. PATENT DOCUMENTS

| 4,165,861 | A | 8/1979 | Hanser |
| 6,308,793 | B1 | 10/2001 | Eberling |
| 6,523,625 | B2 | 2/2003 | Eberling et al. |
| 6,665,597 | B1 | 12/2003 | Hanser et al. |
| 7,066,474 | B2 * | 6/2006 | Hiebert .............. B60G 17/0155 280/124.16 |
| 7,389,994 | B2 | 6/2008 | Trudeau et al. |

(Continued)

FOREIGN PATENT DOCUMENTS

| CA | 2422864 C | 9/2004 |
| CA | 2528069 C | 5/2006 |

(Continued)

*Primary Examiner* — Toan C To
(74) *Attorney, Agent, or Firm* — Field LLP; Charlene M. Lipchen

(57) ABSTRACT

A system and method are provided for configuring suspension ratios in a multi-rear axle vehicle, the vehicle having a drive axle suspension and at least one tag axle suspension, each suspension having one or more air springs. The timing of the performance of an adjustment cycle series of steps for adjusting the suspension height and air spring pressure readings is optimized by monitoring the acceleration of the vehicle and conducting the adjustment cycle steps when the vehicle acceleration is below an acceleration threshold. Additionally, air spring pressure adjustments may be scaled based on a confidence factor of the air spring pressure readings. Finally, a method is provided for configuring suspension ratios in a multi-rear axle vehicle, the vehicle having a drive axle suspension and at least one tag axle suspension, and for adjusting the air suspension pressures.

20 Claims, 5 Drawing Sheets

(56) References Cited

U.S. PATENT DOCUMENTS

| | | | |
|---|---|---|---|
| 7,887,065 B2 | 2/2011 | Trudeau et al. | |
| 8,177,243 B2* | 5/2012 | Boisture | B62D 61/12 |
| | | | 280/81.6 |
| 9,452,655 B2 | 9/2016 | Hiebert et al. | |
| 10,046,814 B2 | 8/2018 | Siuchta et al. | |
| 11,021,033 B2* | 6/2021 | Anderson | B60G 17/052 |
| 2002/0074746 A1* | 6/2002 | Eberling | B60G 17/0155 |
| | | | 180/197 |
| 2004/0084860 A1* | 5/2004 | Svartz | B60G 9/003 |
| | | | 280/6.159 |
| 2006/0267296 A1 | 11/2006 | Dodd et al. | |
| 2009/0033055 A1 | 2/2009 | Morris et al. | |
| 2013/0140784 A1 | 6/2013 | Ehrlich | |
| 2016/0332498 A1* | 11/2016 | Lindsay | B62D 61/12 |
| 2017/0361672 A1* | 12/2017 | Ahmadian | B60G 17/019 |

FOREIGN PATENT DOCUMENTS

| | | |
|---|---|---|
| EP | 0301225 A1 | 2/1989 |
| WO | 2000000360 A1 | 1/2000 |

* cited by examiner

ELECTRONIC SUSPENSION CONTROL SYSTEM FOR A VEHICLE

CROSS-REFERENCE TO RELATED APPLICATIONS

This application claims the benefit of U.S. Provisional patent application No. 63/057,997 and Canadian patent application no. 3,088,369, both of which were filed on Jul. 29, 2020 and both entitled "Electronic Suspension Control System for a Vehicle", and both of these prior applications are incorporated herein by reference.

FIELD

The present disclosure relates to a system for electronically controlling the axle suspension of a vehicle with multiple rear axles, to allow for optimization of load distribution on the vehicle.

BACKGROUND

Vehicles having multiple rear axles are often used to carry heavy loads, and can include semi-trailers, large buses and other large load carrying vehicles.

Typically such vehicles have a front steering, non-driving axle which imparts steering control; a drive axle behind the steering axle, to impart driving force; and one or more tag axles behind the drive axle to support the weight of the vehicle chassis and loads carried therein.

Balance and control of suspension in each axle and between the axles is needed to provide load support, traction and control of the vehicle as well as to provide a comfortable ride. While in some cases, such suspensions are mechanical spring suspensions, in other cases air spring suspensions may be used, which are controllable.

The ride height, or in other words the height of the body of the vehicle with respect to the road, may also be manipulated by adjusting axle suspensions.

It is also often important to ensure that suspension air pressure readings are in fact accurate. Many factors including driving conditions and acceleration state can affect the accuracy of air pressure and ride height readings and these need to be taken into account when ensuring suspension and ride height data is correct.

Applicant's own U.S. Pat. Nos. 7,066,474 and 9,452,655 teach methods of suspension and level control in recreation vehicles employing air suspension systems.

Applicant's Canadian patent no. 2,422,864 C teaches a suspension and level control system to independently control inflation and deflation of left and right front and rear air-springs in a parallel pneumatic circuit. While control of air pressure in each air cushion of each air spring is controlled individually, there is no means for determining the relative air pressures between the different air spring suspensions.

United States patent publication no. US 20060267296A1 teaches a system in which the height of the air bag of a vehicle suspension system is sensed by a pair of tilt sensors, sensing tilt of its location with respect to gravity, and the difference in tilt indicates the air bag height. The output of the tilt sensors may be filtered, and a motion detector allows rapid filling or dumping of air bags independent of filtering of tilt sensor signals. Control of the vehicle's air suspension can also be based upon inputs from one or more air bag pressure sensors.

U.S. Pat. No. 6,523,625 B2 teaches a system and method for improving the traction of a vehicle using weight distribution control to improve wheel to driving surface friction. Actuators and controllers adjust suspension members in a selectable predetermined manner. The selection can be based on operator preference, vehicle operating mode, or a sensed loss of traction. The driven axle carries a drive axle maximum rated load in order to maximize drive wheel traction at all times.

International publication no. WO2000000360A1 teaches an air suspension assembly tied to an antilock/traction controller. Thus, in response to a differential traction control event, pressurized air to air bags associated with the suspension assembly is regulated to transfer greater vehicle load to the drive axle.

However, a need still exists for a means to determine whether air pressure and suspension height readings from the air springs, may be relied upon as accurate when the vehicle is in motion. A need also exists for means to control air suspension pressures between axles of a multiple axle vehicle and for a system that can take into account driving conditions, acceleration, speed, load and ride height in controlling the relative air pressure between air suspensions of each axle.

SUMMARY

The present disclosure relates to systems and methods for electronically controlling the axle suspensions of a vehicle with multiple rear axles, to optimize the load distribution of the vehicle. Advantageously, the systems and methods described herein are tied to the monitoring of a ratio of the air suspension pressures as between the tag axle and the drive axle, and then controlling the pressures of the individual air springs to maintain that ratio at a target ratio. The target ratio is selected based on a number of factors, including but not limited to the vehicle's chassis configuration, towing status, towing load, vehicle loading, driving conditions, and any combination of those factors.

The applicants have found that a vehicle's acceleration will impact the measurement of the pressures of the individual suspension air springs, which pressure measurements tend to rapidly fluctuate during periods of increased acceleration. When the vehicle is under an acceleration threshold, the pressure measurements tend to be more stable, and therefore provide more reliable data for determining what adjustments to the air spring pressures may be required to maintain the tag-to-drive axle air spring pressures at the targeted ratio. Therefore, in one aspect of the present disclosure, the systems and methods disclosed herein incorporate monitoring the acceleration of the vehicle, and timing the measurement of the air spring pressures and vehicle ride height, and the subsequent adjustment of the air spring pressures and/or vehicle ride height, to periods when the vehicle's acceleration is beneath an acceleration threshold, therefore increasing the reliability of the pressure and ride height measurements on which the air spring pressure adjustments are calculated. In some embodiments, the systems and methods include calculating a confidence factor based on the acceleration of the vehicle, and timing the pressure measurements and air spring adjustment cycle for when the confidence factor is high, indicating a high level of confidence in the accuracy of the pressure measurements.

In other embodiments, where the vehicle may undergo an extended period of acceleration above the acceleration threshold, it may be desirable to set a maximum time interval between air spring adjustments, whereby the air spring adjustment cycle is performed even when the confidence factor is lower. In such cases, the confidence factor may be used to scale the calculated air spring pressure adjustments, so as to reduce the amount by which the air spring pressures are adjusted. Advantageously, scaling the air spring pressure adjustments reduces the risk of performing larger adjustments based on potentially inaccurate pressure measurement data, which larger adjustments may lead to a tag-to-drive axle air spring pressure ratio that is farther from the target tag-to-drive ratio.

In one aspect of the present disclosure, a method for adjusting air spring suspensions of a multi-rear axle vehicle to maintain a target ratio of tag-to-drive axle air spring pressures is provided. The method comprises the steps of:
  a. monitoring an acceleration of the vehicle;
  b. monitoring a pressure of each air spring of a tag axle suspension and of a drive axle suspension of the vehicle using at least one pressure transducer;
  c. determining if a normal time interval has passed since a previous adjustment cycle was performed;
  d. once the normal time interval has passed, taking a pressure measurement of each said air spring of the tag and driving axle suspensions when the said acceleration of the vehicle is below an acceleration threshold, and then performing an adjustment cycle comprising the steps of:
    i. calculating a confidence factor based on the acceleration of the vehicle;
    ii. calculating a ratio of tag-to-drive axle air spring pressure, based on the said pressure measurement of each air spring;
    iii. assessing the calculated ratio of tag-to-drive axle air spring pressure against a target ratio to determine if the pressure of each said air spring requires adjustment;
    iv. if the pressure of each said air spring requires adjustment, calculating a scaled adjustment of the pressure of each said air spring based on the confidence factor;
    v. adjusting the pressure of each said air spring using the scaled adjustment;
    vi. resetting a timer to count down to a further normal time interval since step (v) was performed;
    vii. repeating steps (a) to (d).

In some embodiments, if the acceleration of the vehicle does not fall below the acceleration threshold before a maximum time interval has passed since the previous adjustment cycle was performed, then, once the maximum time interval is reached, the adjustment cycle steps (i) to (vii) are performed. In another aspect, step (b) of the above-described method further comprises monitoring a ride height of the vehicle, and the adjustment cycle step (iii) further comprises assessing the measured ride height of the vehicle against a target ride height to determine if the said ride height requires adjustment. In such embodiments, the adjustment cycle step (iv) further comprises calculating a scaled adjustment of the ride height based on the said confidence factor, and finally, the adjustment cycle step (v) further includes adjusting the ride height of the vehicle using the scaled ride height adjustment.

Regarding the confidence factor, in some embodiments the adjustment cycle step (i) described above further comprises initially setting the confidence factor to 1.0, correlating to a full confidence in the said pressure measurement of each said air spring, and subsequently decreasing the confidence factor based on the acceleration of the vehicle.

The acceleration measurements of the vehicle, in some embodiments, comprises a lateral acceleration measurement, a longitudinal acceleration measurement, a vertical acceleration measurement, and a vehicle speed acceleration measurement.

The pressure measurement of each said air spring of the tag and driving axle suspensions may be taken at the start of driving, and subsequently at the said normal time intervals during driving. The normal time interval may be adjusted at different times during a trip; for example, the normal time interval may be an initial normal time interval near the start of driving, and then the normal time interval subsequently increases so as to be greater than the initial normal time interval, once the said target ratio is reached. For example, the initial normal time interval near the start of driving is selected from a range of 1 second to 60 seconds, or the initial normal time interval may be less than one minute. Once the said target ratio is reached, the normal time interval may be increased; for example, the normal time interval may be selected from a range of one minute to ten minutes.

In another aspect of the present disclosure, a system for adjusting air spring suspensions of a multi-rear axle vehicle to maintain a target ratio of tag-to-drive axle air spring pressures comprises:
  a manifold comprising one or more manifold lines for supplying compressed air from a compressed air supply to one or more air springs of a drive axle suspension and a tag axle suspension and for exhausting compressed air from the said one or more air springs, at least one supply valve on the one or more manifold lines located between each air spring of the said one or more air springs and the compressed air supply, and at least one exhaust valve on the one or more manifold lines located between each air spring of the said one or more air springs and an exhaust;
  one or more acceleration state sensors for measuring an acceleration of the vehicle;
  at least one pressure transducer connected to the one or more manifold lines for taking pressure measurements of the one or more air springs;
  a processor receiving signals, the signals containing pressure measurements from the at least one pressure transducer, ride height measurements from the ride height sensor and acceleration measurements from the one or more acceleration state sensors, the processor comprising one or more algorithms for calculating a ratio of tag-to-drive axle air spring pressures based on the said pressure measurements of the at least one transducer, assessing the calculated ratio of tag-to-drive axle air spring pressures against a target ratio to determine if the said air spring pressures require adjustment; calculating a confidence factor based on the said acceleration measurements; calculating a scaled adjustment of the air spring pressures based on the confidence factor if the air spring pressures require adjustment; applying the scaled adjustment of the air spring pressures to each said air spring so as to obtain the target ratio of tag-to-drive axle air spring pressures.

Some embodiments of the present disclosure further include a ride height sensor for monitoring a ride height of the vehicle; and wherein the said one or more algorithms of the processor further include assessing the measured ride height of the vehicle against a target ride height; calculating a scaled ride height adjustment of the ride height based on the confidence factor if the ride height requires adjustment; and applying the scaled ride height adjustment to the air springs so as to obtain the target ride height.

In other embodiments, the one or more manifold lines comprises two parallel manifold lines, one for each of the tag axle suspension and the drive axle suspension, and wherein the at least one pressure transducer comprises a first and second pressure transducers connected to each of the two parallel manifold lines, the first pressure transducer for measuring the pressure of the at least one air spring of the tag axle suspension and the second pressure transducer for measuring the pressure of the at least one air spring of the drive axle suspension. The at least one pressure transducer may comprise a dedicated pressure transducer for each of the one or more air springs for measuring the pressure of the one or more air springs. In such embodiments, the pressure measurements and the calculated air suspension ratio may indicate real-time or near real-time driving conditions.

It is understood that other aspects of the present disclosure will become readily apparent to those skilled in the art from the following detailed description, wherein various embodiments of the disclosure are shown and described by way of illustration. As will be realized, the disclosure is capable of other and different embodiments and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

The following drawings depict only illustrative embodiments of the disclosure and are therefore not to be considered limiting of its scope. In the drawings.

DETAILED DESCRIPTION

Figure 1:
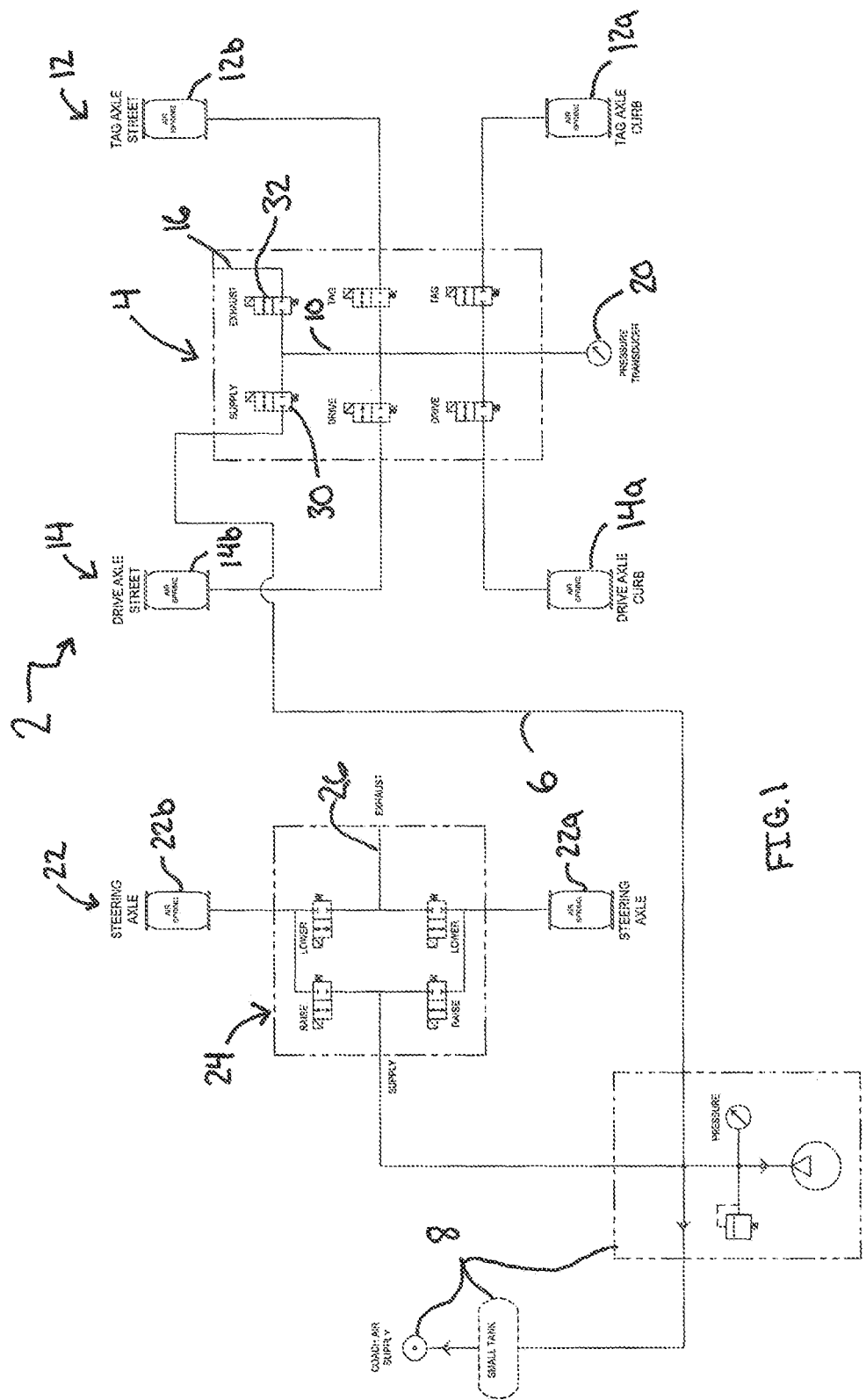
FIG. 1 is schematic diagram of an embodiment of a system of the present disclosure, having a single chamber rear manifold and a single pressure transducer.

The description that follows and the embodiments described therein are provided by way of illustration of an example, or examples, of the various aspects of the present disclosure. These examples are provided for the purposes of explanation, and not of limitation, of those aspects of the disclosure.

The present disclosure provides a system for electronically maintaining configurable ratios between air spring pressures in various axles of a multiple rear axle vehicle, to allow for optimization of load distribution, balance and control of the vehicle. The disclosure is particularly related to, but not limited to, vehicles carrying large loads or towing trailers behind the vehicle.

In some embodiments, the systems and methods of the present disclosure provide for greater accuracy in adjusting a ratio of the tag-to-drive axle air spring pressures to attain a target ratio, by monitoring the acceleration of the vehicle and limiting the measurement of the pressure in each air spring to periods of time when the vehicle is experiencing less acceleration. When a vehicle is undergoing acceleration, the measurement of the air pressure in the individual air springs of the tag and drive axles will fluctuate, leading at times to high pressure readings that do not accurately reflect the true ratio of tag-to-drive axle air spring pressures at the time the measurement is taken. As such, in one aspect of the disclosure, the system and methods are configured to monitor the acceleration of the vehicle and only take pressure measurements when the vehicle is experiencing low acceleration or no acceleration. In some embodiments, the system and methods are configured to assign a confidence factor to the pressure measurements based on the measured acceleration of the vehicle at the time the pressure measurements are taken, the confidence factor reflecting the level of confidence in the accuracy of the pressure measurements taken at that point in time. The confidence factor is then applied to scale down any adjustments made by the system to the pressure in each of the air springs, so as to result in a smaller adjustment of the air spring pressures to attain the target ratio of tag-to-drive axle air spring pressures. As a result, potentially large and erroneous adjustments to the air spring pressures, based on potentially inaccurate pressure measurement data, are avoided.

The system utilizes measurements of the vehicle's acceleration, speed and ride height, and performs calculations to determine whether there is a high confidence level in the pressure readings. Once it is determined that there is a high confidence level in the pressure readings, the present system may be configured to change the pressurization of the air springs so as to maintain a particular air suspension pressure ratio between the tag and drive axles.

It is not uncommon in such vehicles for the load bearing tag axles to reach suspension capacity before other axles. In such cases, it may be useful to reduce pressure in the tag axle suspension and to reach an optimal proportion of air pressure between axle suspensions; in particular, as between the drive axle and the one or more rear tag axles.

With reference to FIGS. 1 to 4, the suspension control system 2 includes a manifold assembly 4, said manifold assembly 4 having at least one inlet line 6 connected to a compressed air supply source 8. The manifold assembly includes at least one manifold line 10 to supply compressed air to the tag axle air springs 12a, 12b of tag axle 12, and the drive axle air springs 14a, 14b of drive axle 14, of an air suspension system. Manual fill lines (not shown) may also be included on all axle suspensions. In FIGS. 1 to 4, a single drive axle 14 and a single tag axle 12 are shown, although it would be understood by a person of skill in the art that multiple tag axles may be present.

Figure 2:
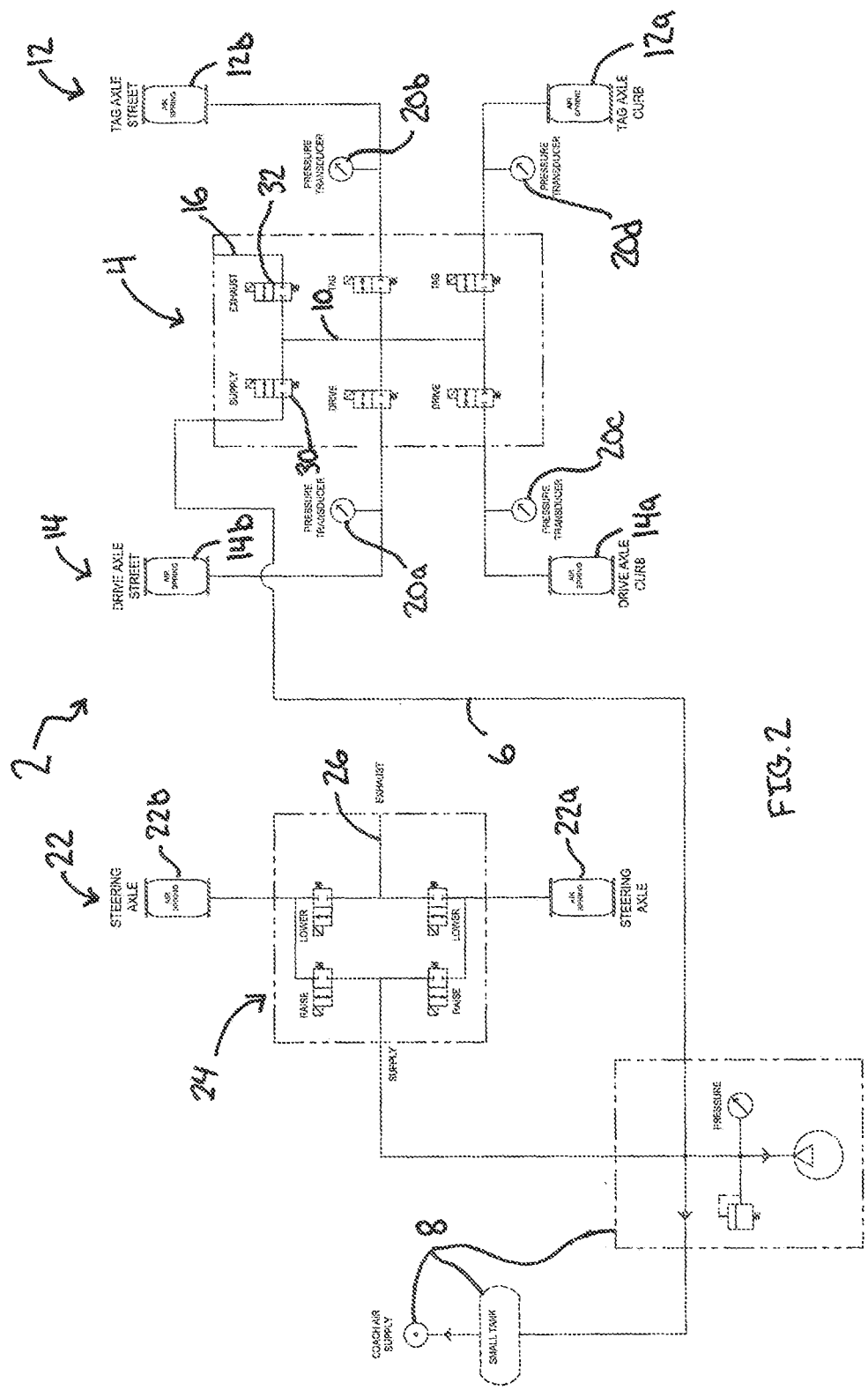
FIG. 2 is schematic diagram of another embodiment of a system of the present disclosure, having a single chamber rear manifold and four rear pressure transducers.

Supply valves 30 are provided on the manifold lines 10 between the air springs 12a, 12b, 14a, 14b, and the inlet line 6, and exhaust valves 32 are provided between the air springs 12a, 12b, 14a, 14b and the exhaust line 16. Valves 30 and 32 are controlled by the system of the present disclosure to allow for pressurizing or depressurizing of each of the air springs as needed. The manifold assembly also includes an exhaust line 16 for exhausting any of the air springs of any tag or drive suspensions. In FIGS. 1 and 2, a single chamber manifold 4 is illustrated, whereas in FIGS. 3 and 4, a dual chamber manifold 4a, 4b is illustrated, wherein the manifold chamber 4a includes a dedicated manifold line 10a connected to dedicated supply valve 30a and dedicated exhaust valve 32a for controlling the air springs 14a, 14b of the drive axle 14. Similarly, manifold chamber 4b includes a dedicated manifold line 10b connected to a dedicated supply valve 30b and a dedicated exhaust valve 32a for controlling air springs 12a, 12b of the tag axle 14.

Figure 3:
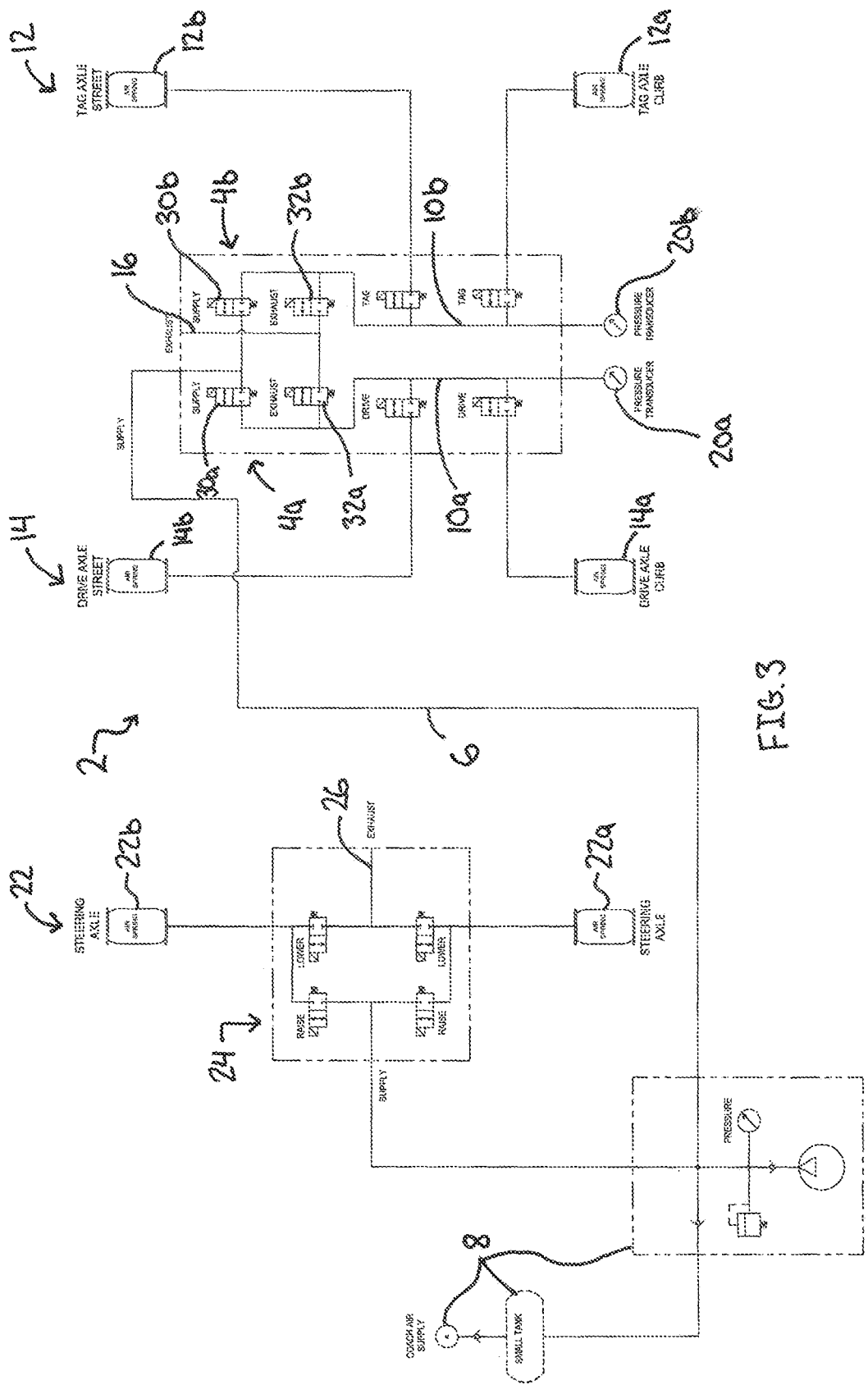
FIG. 3 is a schematic diagram of another embodiment of a system of the present disclosure, having a dual chamber rear manifold, each manifold having a pressure transducer.
Figure 4:
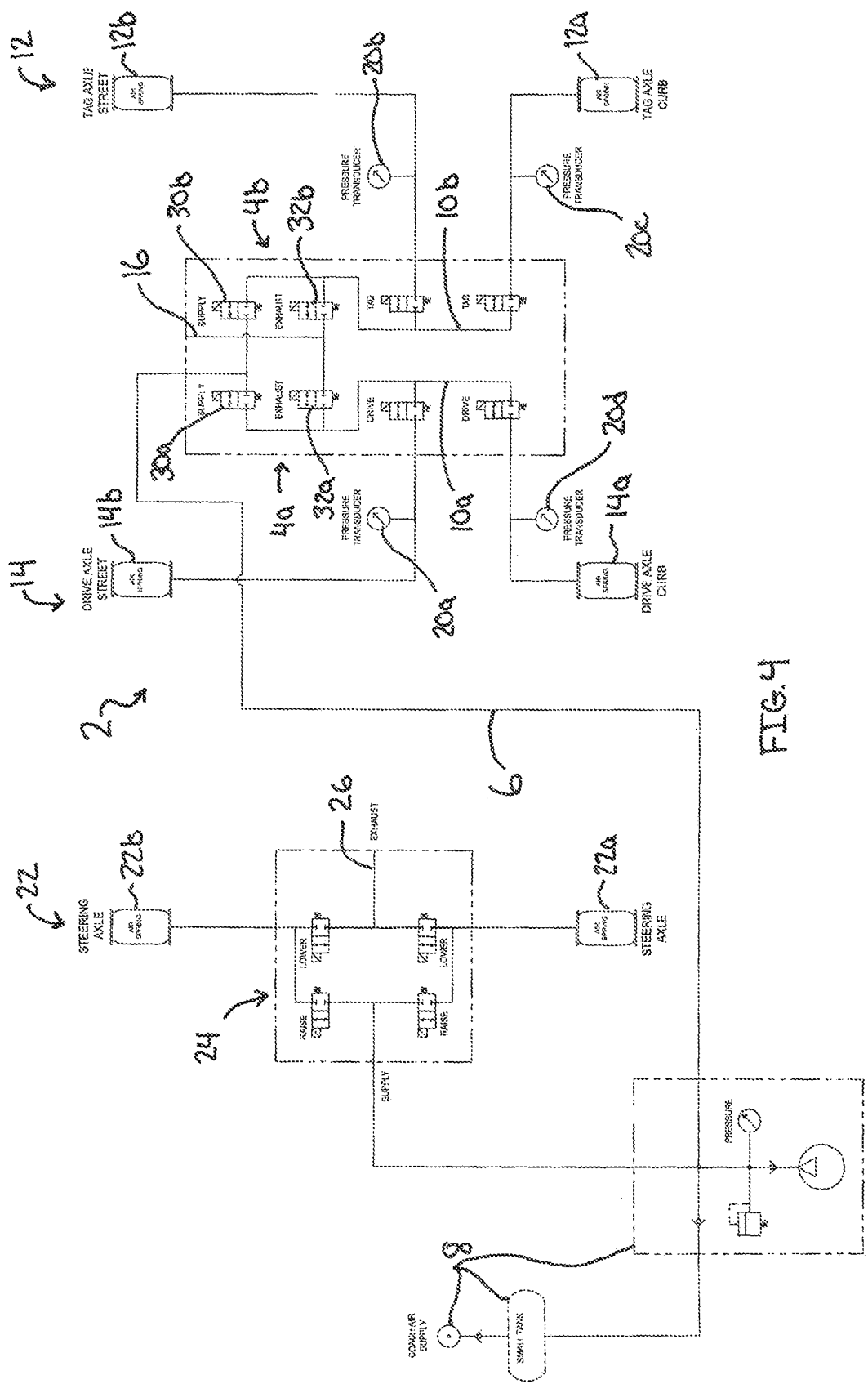
FIG. 4 is a schematic diagram of another embodiment of a system of the present disclosure, having a dual chamber rear manifold and four rear pressure transducers.

FIG. 1 illustrates a system in which a single rear pressure transducer 20 is connected to the manifold line 10. FIG. 2 illustrates a system having individual, dedicated rear pressure transducers 20a, 20b, 20c, 20d connected to each of the air springs 12a, 12b, 14a, 14b. FIG. 3 illustrates a system in which the dual chamber manifold assembly 4a, 4b includes two parallel manifold lines 10a, 10b, one for each of the drive and tag axles 14, 12, and a dedicated pressure transducer 20a connected to manifold line 10a for monitoring the drive axle air springs 14a, 14b, and a second dedicated pressure transducer 20b connected to manifold line 10b for monitoring the tag axle air springs 12a, 12b. FIG. 4 illustrates a system in which the dual chamber manifold assembly 4a, 4b includes two parallel manifold lines 10a, 10b and a separate, dedicated rear pressure transducer 20a, 20b, 20c, 20d connected to each of the air springs 12a, 12b, 14a, 14b. Thus, it will be appreciated that the manifold assembly may be configured in different ways, using shared or dedicated exhaust and supply valves and shared or dedicated pressure transducers for controlling and monitoring the air springs of the drive and tag axles, illustrative examples of which are provided in FIGS. 1 to 4.

With reference to the Figures, the steering axle 22 and associated suspensions 22a, 22b may also be air spring suspensions and may optionally also be connected to the same compressed air source 8 by its own valve assembly 24, including an exhaust 26. The steering axle suspensions 22a, 22b may also include a pressure transducer of its own, or may have dedicated pressure transducers for each steering axle suspension 22a, 22b (not shown).

The system monitors air spring pressures in each of the drive and tag axle suspensions using the pressure transducers. While using a single pressure transducer to monitor more than one air spring may be desirable due to lower cost and less maintenance, the frequency of pressure measurements required to achieve accuracy may lead to increased valve wear due to repeated opening and closing of valves to isolate a particular air spring for pressure measurement.

However, in the present system and methods, as described in further detail below, the timing of pressure measurements may be optimized so that even in a single pressure transducer embodiment, more reliable pressure data may be achieved without increasing the reading frequency, leading to a reduction in valve wear.

In the embodiments of FIGS. 2 and 4, each embodiment of the system illustrated comprises separate pressure transducers 20a through 20d for each of the drive and tag axle suspension air springs 14a, 14b, 12a, 12b. These configurations enable the reading of pressures in each of the drive and tag axle air springs simultaneously, which also leads to a tag-to-drive suspension ratio that is more reflective of real time or near-real time conditions. The system may be programmed to adjust the air spring pressures in response to the pressure transducer measurements, to maintain a target ratio of air suspension pressures.

In another aspect, the present systems and methods provide a set of threshold target ratios of tag-to-drive axle air spring pressures, which allows for optimal performance of the vehicle in various conditions. The present system is in contrast to prior systems, which measure and adjust drive and tag suspension pressures in unison to a desired value for each individual suspension. In the present disclosure, it is maintaining a particular, pre-determined target ratio between the tag and drive axle air suspension pressures (referred to interchangeably herein as the "ratio of tag-to-drive axle air spring pressures" or the "tag-to-drive ratio") that the applicant has found to improve load bearing and balancing performance of the vehicle.

The system may be programmed with multiple configured ratios of tag-to-drive axle air suspension pressures that may be selected based on the vehicle's operating condition, such as towing a trailer or changing the weight distribution of loaded cargo. The goal is to maintain vehicle ride height and a balanced weight across the vehicle. Factors for setting desired ratios can depend on the configuration of the vehicle chassis or frame, loading of the vehicle, whether the vehicle is towing a load and the nature of that load and driving conditions, amongst other factors.

One or more acceleration state sensors, which may include for example speed sensors or accelerometers, provide information about the acceleration state of the vehicle, such as an indication of whether the vehicle is accelerating, decelerating, stopped or turning.

Sensor data and air pressure sampling may be taken at the start of a trip, and then throughout the trip at various intervals. In some embodiments, initially the sampling and reading intervals are more frequent, preferably less than one minute. Once an optimal ratio of tag-to-drive air suspension pressures is achieved, then the sampling rate may preferably be reduced, for example between one and ten minutes, so as to reduce the wear on the valves.

Further measurements and inputs into algorithms of the present system allow for air pressure adjustments to be made to maintain the selected air pressure ratio. For example, the system may include one or more ride height sensors to provide ride height information for each axle. Said ride height information may also be provided as input into the algorithms of a system processor to determine how much air should be added to or removed from any particular air spring of a particular axle suspension so as to maintain the desired ratio of air pressure between the tag and drive suspensions.

The present system and algorithms provide a proportional ratio of axle suspension pressures that allows for pressure in any of the drive or tag suspensions to be adjusted to meet that ratio, rather than adjusting all of the tag and drive suspensions together. Since the present system is tag suspension-to-drive suspension ratio driven, the pressures in the individual air springs are less important that the overall tag-to-drive ratio.

In the single rear pressure transducer embodiment of the present invention, illustrated in FIG. 1, and the dual rear pressure transducer embodiment of the present invention, illustrated in FIG. 3, driving data is used to optimize the timing of the pressure readings, leading to more reliable pressure data without the need for frequent pressure reading.

For example, the reliability of a pressure reading may be assessed by reading the acceleration of the vehicle before, during and after the air suspension pressures are read. In this example, taking acceleration readings before, during and after the pressure readings enables the calculation of a confidence factor, which reflects the level of confidence in the accuracy of the pressure readings. The confidence factor may then be applied to scale the pressure adjustments to each air spring when the system adjusts the tag suspension-to-drive suspension ratio. Additionally, the confidence factor may be used by the system to determine when a pressure reading and subsequent adjustment to each air spring should be made. For example, the system may be configured to continuously monitor the acceleration of the vehicle and only measure the pressure of each air spring when the acceleration of the vehicle is below an acceleration threshold, which is associated with a higher confidence level in the accuracy of the pressure readings.

In a system with dedicated pressure transducers for each air spring, the pressure of each air spring may be monitored frequently or continuously, and an average of the pressure readings may be taken to reduce the effect of fluctuations in pressure readings caused by vehicle acceleration. However, in single or dual pressure transducer systems, the pressure in the air springs must be read sequentially, which involves the sequential opening of each air spring valve, one at a time, so as to expose the pressure transducer to each individual air spring being monitored by that transducer. Therefore, in single or dual pressure transducer systems, it is preferable to reduce the frequency of air pressure measurements so as to reduce the wear on the valves. Advantageously, by timing the pressure measurements to coincide with periods of low vehicle acceleration, the frequency of pressure measurements may be reduced while resulting in more reliable pressure data for adjusting the ratio of tag-to-drive axle air spring pressures, thereby allowing the system to maintain the tag-to-drive axle air spring pressure ratio at the target ratio while using a single transducer or two transducers.

In a preferred embodiment, fluctuations in air pressure and suspension height data are taken into account by the algorithms of the present system, together with further data measurements, such as acceleration and speed, to scale the air pressure and ride height adjustments being made by the system.

The present system and associated algorithms function while the vehicle is stationary and in motion. When a vehicle is in motion, the air spring pressures fluctuate depending on driving and road conditions. To increase the accuracy of air pressure measurements, the system monitors parameters such as the vehicle's acceleration state and speed to establish a confidence level for whether the air pressure and suspension height measurements are accurate and may be relied upon to calculate adjustments to the pressures in the air springs, so as to maintain the target ratio of tag-to-drive axle air spring pressures. The present system thus allows suspension air pressure and the ride height, which is a function of suspension pressure, to be controlled with only one pressure transducer or with only two transducers.

Figure 5:
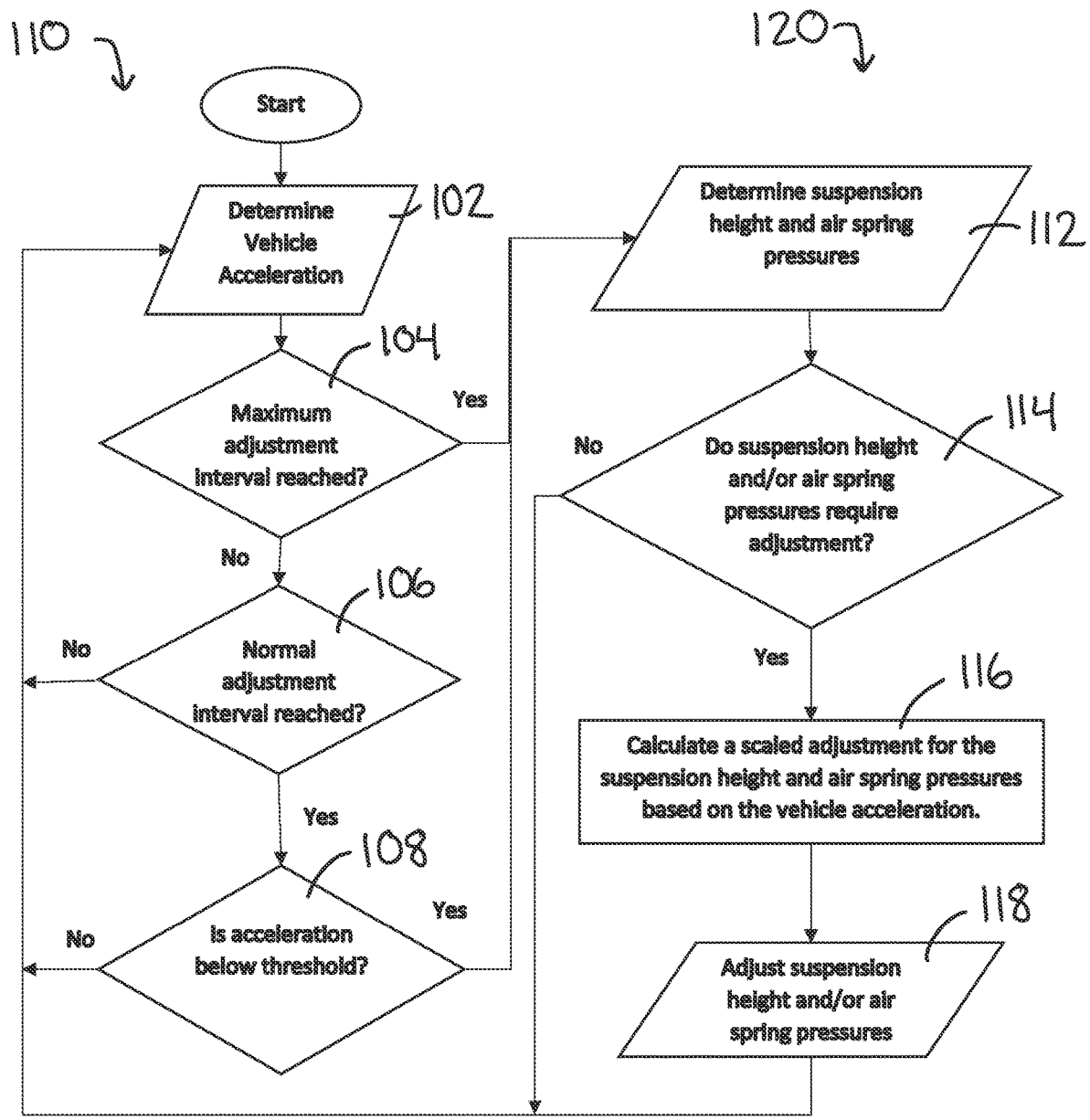
FIG. 5 is a logic flow diagram illustrating an embodiment of a method of the present disclosure.

FIG. 5 illustrates one example of a set of decisions performed by the algorithms of the present invention. The steps of FIG. 5 can be subdivided into an acceleration reading cycle 110 and an adjustment cycle 120. In this example, both a normal and maximum interval of time are set for reading and adjusting suspension height and air spring pressures in the adjustment cycle. With reference to FIG. 5, firstly, acceleration of the vehicle is determined at step 102. Next, preferably but not required for all embodiments, at step 104, a determination is made of whether the maximum adjustment time interval has passed since the algorithm last ran the adjustment cycle of steps. If the maximum time interval has been reached, then, regardless of the acceleration reading, an adjustment cycle is performed, as described below.

If the maximum adjustment time interval has not passed, or for embodiments which do not include determining whether a maximum time interval has been reached at step 104, then a determination is made of whether the normal adjustment time interval has been reached, at step 106.

If the normal adjustment interval has also not been reached, or if a normal adjustment interval has been reached but acceleration is not below a predetermined threshold value as determined at step 108, then the vehicle's acceleration continues to be monitored until it is detected that the vehicle is below the acceleration threshold. Once the vehicle is below the acceleration threshold, the adjustment cycle is then performed, as described below.

If the maximum adjustment time interval has been reached; or if the normal adjustment interval has been reached and acceleration is below the predetermined threshold, then the system performs the adjustment cycle series of steps 120, as follows:

a. the suspension height and/or air spring pressures are measured, at step 112;

b. the ride height and/or air spring pressure readings, including a ratio of tag-to-drive axle air spring pressures that is calculated from the air spring pressure readings, are compared to respective suspension height and ratio target values, and corresponding tolerances, to determine if the ride heights and/or air spring pressures require adjustment; at step 114;

c. a scaled adjustment of the suspension heights and/or air spring pressures is calculated, based on vehicle speed and acceleration; at step 116; and d. suspension heights and/or air spring pressures are adjusted according to the scaled adjustments, at step 118.

Once suspension height and air spring pressures are adjusted, or should no adjustment be required, then a new adjustment interval time is started and another vehicle acceleration reading is taken to start a new acceleration reading cycle.

No adjustment is required if the suspension height and air spring pressures are within the target value and corresponding tolerance range. For example, a target ride height may be zero inches with a tolerance of +/−0.1 inches, and a target tag-to-drive axle air spring pressure ratio may be 110%, with a tolerance of +/−5%. An adjustment to the pressure in the respective air springs would be required if the suspension height is found to be above 0.1 inches or below 0.1 inches, and/or if an air spring pressure ratio is found to be higher than 115% or lower than 105%.

In one example, acceleration data is used to set a confidence factor associated with the suspension height and/or air spring pressure. Acceleration of the vehicle is typically measured in a number of different planes: lateral acceleration refers to forces on a vehicle that are orthogonal to the direction of travel, often felt in turning; longitudinal acceleration relates to forces along the direction of travel, often felt during climbing up or descending down an incline; vertical acceleration relating to bumps or up and down forces felt by the vehicle, for example when travelling on straight roads that have dips and humps that cause the two ends of the vehicle to oscillate up and down, opposite each other. Additionally, acceleration or deceleration of the vehicle as it speeds up or slows down are also taken into account.

In one example, the confidence factor may initially be set to 1.0, correlating to a full confidence in suspension height and/or air spring pressure readings. Depending on vehicle acceleration, the confidence factor may be adjusted as follows If the change in lateral acceleration is higher than 1.5 mg/ms the confidence factor is decreased by 10% to 0.9;

If the change in longitudinal acceleration is higher than 1 mg/ms the confidence factor is decreased by 20% to 0.8;

If the change in vertical acceleration is greater than 1 mg/ms the confidence factor is decreased by 20% to 0.8;

If the vehicle speed is accelerating or decelerating 6 km/h/s the confidence factor is decreased by 40% to 0.6;

If the vehicle speed is accelerating or decelerating 2 km/h/s the confidence factor is decreased by 20% to 0.8.

Once the confidence factor is established, it may be monitored by the system to determine when the pressure measurements should be made and an adjustment cycle undertaken based on those pressure measurements, by continually monitoring the acceleration measurements and the associated confidence factor after the normal time interval since the last adjustment cycle has ended, and proceeding with the pressure measurements and adjustment cycle when a high confidence factor is obtained (or in other words, proceeding with the pressure measurements and adjustment cycle when the vehicle is under a threshold acceleration). The applicant has observed that both vehicle braking (deceleration) and vehicle acceleration have a large impact on suspension air pressures. By contrast, the applicant has surprisingly found that cornering (that is, lateral acceleration forces) and driving on rough roads (that is, quick and low amplitude vertical acceleration forces) have little effect on the air spring pressures when comparing the drive and tag axle suspension pressures on a given side of the vehicle.

In some cases, the vehicle's acceleration may exceed the acceleration threshold for an extended period of time after the normal time interval since the last adjustment cycle has lapsed. The applicant has found that when this occurs, the system should preferably establish a maximum time interval between adjustment cycles, so that the air springs are still regularly adjusted to maintain the optimal, target ratio of tag-to-drive axle air spring pressures. In some embodiments, the maximum time interval may be set as double the length of time of the normal time interval. For example, without intending to be limiting, if the normal time interval since the last adjustment cycle was performed is 5 minutes, the maximum time interval since the last adjustment cycle may be set at 10 minutes. Thus, in some embodiments, if the vehicle's acceleration does not fall below the threshold acceleration before a maximum time interval is reached, when the maximum time interval is reached, the adjustment cycle steps are performed based on the pressure measurements obtained at that time. Because the vehicle may be over the acceleration threshold at the time the pressure measurements are taken, the pressure readings may fluctuate and may not reflect the true ratio of tag-to-drive axle air spring pressures. Therefore, the confidence factor is used to scale down the adjustments to the air springs, by multiplying the calculated air spring adjustments by the confidence factor.

Consider the following example, where a confidence factor is calculated to be 0.5 at the time the air spring pressures and the ride heights are measured, and the left and right ride heights are 0.5" over the target ride height, and the tag-to-drive ratio is 10% higher in the drive axle than the tag axle as compared to the target tag-to-drive ratio. In such a scenario, the system would reduce the pressure in the drive axle air springs to reduce the ride height to only 0.25" over the target ride height, and adjust the pressure to be only 5% higher in the drive axle than in the tag axle, by applying the confidence factor of 0.5 to the calculated pressure adjustments to arrive at scaled air spring pressure adjustments that are 50% of the calculated pressure adjustments. The system may additionally increase the pressure in the tag axle air springs if it is determined the tag axle air spring pressures need to be increased to maintain the ride height at 0.25" over the target ride height, and to maintain the drive-to-tag ratio at 5% higher in the drive axle than the tag axle. Advantageously, if the pressure measurements, on which the calculated air spring adjustments are calculated, inaccurately reflected a higher ride height and tag-to-drive ratio because of the fluctuating pressure measurements taken when the vehicle was accelerating, the scaling back of the calculated air spring pressure adjustments by applying the confidence factor results in less dramatic adjustments to the pressures in the air springs, so as to avoid errors in air spring adjustments that may otherwise adjust the tag-to-drive ratio farther away from the target ratio. In some embodiments, the pressure adjustments are calculated by the system as the length of time that the pneumatic supply and exhaust valves need to be energized based on the rate of change of the pressures in the air springs when the respective supply or exhaust valves are open.

Regarding acceleration of the vehicle, the applicant found that travelling on straight roads that have dips and humps (slower or higher amplitude vertical acceleration) has a larger effect on suspension air pressure when comparing the drive and tag axle suspensions on a given side of the vehicle.

The system also provides ability to measure the weight of the vehicle. Sprung weight of a vehicle may be estimated based on air spring pressures, ride height measurements and use of manufacturer air spring design charts. This weight data is also used in the algorithms to determine existing air suspension pressure ratios and to correct for said ratios.

The previous description of the disclosed embodiments is provided to enable any person skilled in the art to make or use the present disclosure. Various modifications to those embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed is:

1. A method for adjusting air spring suspensions of a multi-rear axle vehicle to maintain a target ratio of tag-to-drive axle air spring pressures, the method comprising the steps of:
   a. monitoring an acceleration of the vehicle;
   b. monitoring a pressure of each air spring of a tag axle suspension and of a drive axle suspension of the vehicle using at least one pressure transducer;
   c. determining if a normal time interval has passed since a previous adjustment cycle was performed;
   d. once the normal time interval has passed, taking a pressure measurement of each said air spring of the tag and drive axle suspensions when the said acceleration of the vehicle is below an acceleration threshold, and then performing an adjustment cycle comprising the steps of:
      i. calculating a confidence factor based on the acceleration of the vehicle;

ii. calculating a ratio of tag-to-drive axle air spring pressure, based on the said pressure measurement of each air spring;
iii. assessing the calculated ratio of tag-to-drive axle air spring pressure against a target ratio to determine if the pressure of each said air spring requires adjustment;
iv. if the pressure of each said air spring requires adjustment, calculating a scaled adjustment of the pressure of each said air spring based on the confidence factor;
v. adjusting the pressure of each said air spring using the scaled adjustment;
vi. resetting a timer to count down to a further normal time interval since step (v) was performed;
vii. repeating steps (a) to (d).

2. The method of claim 1, wherein if the acceleration of the vehicle is not below the acceleration threshold before a maximum time interval has passed since the previous adjustment cycle was performed, then when the maximum time interval is reached, performing the adjustment cycle steps (i) to (vii).

3. The method of claim 2, wherein the maximum time interval is defined as twice the length of time of the normal time interval.

4. The method of claim 1, wherein step (b) further comprises monitoring a ride height of the vehicle; and wherein the adjustment cycle step (iii) further comprises assessing the measured ride height of the vehicle against a target ride height to determine if the said ride height requires adjustment; and wherein the adjustment cycle step (iv) further comprises calculating a scaled adjustment of the ride height based on the said confidence factor; and wherein the adjustment cycle step (v) further includes adjusting the ride height of the vehicle using the scaled ride height adjustment.

5. The method of claim 1, wherein the adjustment cycle step (i) further comprises initially setting the confidence factor to 1.0 correlating to a full confidence in the said pressure measurement of each said air spring, and subsequently decreasing the confidence factor based on said acceleration of the vehicle.

6. The method of claim 5, wherein the acceleration of the vehicle comprises a lateral acceleration measurement, a longitudinal acceleration measurement, a vertical acceleration measurement, and a vehicle speed acceleration measurement.

7. The method of claim 1, wherein the said pressure measurement of each said air spring of the tag and driving axle suspensions is taken at the start of driving, and subsequently at the said normal time intervals during driving.

8. The method of claim 7, wherein the said normal time interval is an initial normal time interval near the start of driving and wherein the normal time interval subsequently increases so as to be greater than the initial normal time interval once the said target ratio is reached.

9. The method of claim 8, wherein the initial normal time interval near the start of driving is selected from a range of 1 second to 60 seconds.

10. The method of claim 9, wherein the normal time interval once the said target ratio is reached is selected from a range of one minute to ten minutes.

11. A system for adjusting air spring suspensions of a multi-rear axle vehicle to maintain a target ratio of tag-to-drive axle air spring pressures, the system comprising:
a manifold comprising one or more manifold lines for supplying compressed air from a compressed air supply to one or more air springs of a drive axle suspension and a tag axle suspension and for exhausting compressed air from the said one or more air springs, at least one supply valve on the one or more manifold lines located between each air spring of the said one or more air springs and the compressed air supply, and at least one exhaust valve on the one or more manifold lines located between each air spring of the said one or more air springs and an exhaust;
one or more acceleration state sensors for measuring an acceleration of the vehicle;
at least one pressure transducer connected to the one or more manifold lines for taking pressure measurements of the one or more air springs;
a processor receiving signals, the signals containing pressure measurements from the at least one pressure transducer and acceleration measurements from the one or more acceleration state sensors, the processor comprising one or more algorithms for calculating a ratio of tag-to-drive axle air spring pressures based on the said pressure measurements of the at least one transducer, assessing the calculated ratio of tag-to-drive axle air spring pressures against a target ratio to determine if the said air spring pressures require adjustment; calculating a confidence factor based on the said acceleration measurements; calculating a scaled adjustment of the air spring pressures based on the confidence factor if the air spring pressures require adjustment; applying the scaled adjustment of the air spring pressures to each said air spring so as to obtain the target ratio of tag-to-drive axle air spring pressures.

12. The system of claim 11 further including a ride height sensor for monitoring a ride height of the vehicle; and wherein the said one or more algorithms of the processor further include assessing the measured ride height of the vehicle against a target ride height; calculating a scaled ride height adjustment of the ride height based on the confidence factor if the ride height requires adjustment; and applying the scaled ride height adjustment to the air springs so as to obtain the target ride height.

13. The system of claim 11, wherein the target ratio is determined based on factors selected from a group comprising: chassis configuration, towing status, towing load, vehicle loading, driving conditions and combinations thereof.

14. The system of claim 11, wherein the one or more manifold lines comprises two parallel manifold lines, one for each of the tag axle suspension and the drive axle suspension, and wherein the at least one pressure transducer comprises a first and second pressure transducers connected to each of the two parallel manifold lines, the first pressure transducer for measuring the pressure of the at least one air spring of the tag axle suspension and the second pressure transducer for measuring the pressure of the at least one air spring of the drive axle suspension.

15. The system of claim 11, wherein the at least one pressure transducer comprises a dedicated pressure transducer for each of the one or more air springs for measuring the pressure of the one or more air springs.

16. The system of claim 15, wherein the pressure measurements and the calculated air suspension ratio indicates real-time driving conditions.

17. A method for adjusting air spring suspensions of a multi-rear axle vehicle to maintain a target ratio of tag-to-drive axle air spring pressures using the system of claim 11, the method comprising the steps of:
a. monitoring an acceleration of the vehicle, using the one or more acceleration state sensors;

b. monitoring a pressure of each air spring of a tag axle suspension and of a drive axle suspension of the vehicle using the at least one pressure transducer;
c. determining if a normal time interval has passed since a previous adjustment cycle was performed;
d. once the normal time interval has passed, taking a pressure measurement of each said air spring of the tag and drive axle suspensions when the said acceleration of the vehicle is below an acceleration threshold, and then performing an adjustment cycle by the processor, the adjustment cycle comprising the steps of:
  i. calculating the confidence factor based on the acceleration of the vehicle;
  ii. calculating the ratio of tag-to-drive axle air spring pressure, based on the said pressure measurement of each air spring;
  iii. assessing the calculated ratio of tag-to-drive axle air spring pressure against the target ratio to determine if the pressure of each said air spring requires adjustment;
  iv. if the pressure of each said air spring requires adjustment, calculating a scaled adjustment of the pressure of each said air spring based on the confidence factor;
  v. adjusting the pressure of each said air spring using the scaled adjustment;
  vi. resetting a timer to count down to a further normal time interval since step (v) was performed;
  vii. repeating steps (a) to (d).

18. The method of claim 17, wherein if the acceleration of the vehicle is not below the acceleration threshold before a maximum time interval has passed since the previous adjustment cycle was performed, then when the maximum time interval is reached, performing the adjustment cycle steps (i) to (vii).

19. The method of claim 17, wherein step (b) further comprises monitoring a ride height of the vehicle using the ride height sensor; and wherein the adjustment cycle step (iii) further comprises assessing the measured ride height of the vehicle against a target ride height to determine if the said ride height requires adjustment; and wherein the adjustment cycle step (iv) further comprises calculating a scaled adjustment of the ride height based on the said confidence factor; and wherein the adjustment cycle step (v) further includes adjusting the ride height of the vehicle using the scaled ride height adjustment.

20. The method of claim 17, wherein the adjustment cycle step (i) further comprises initially setting the confidence factor to 1.0 correlating to a full confidence in the said pressure measurement of each said air spring, and subsequently decreasing the confidence factor based on said acceleration of the vehicle.

* * * * *